United States Patent [19]

Kuintzle, Jr. et al.

[11] 4,212,595

[45] Jul. 15, 1980

[54] AIR PUMP WITH PRIMARY AND SECONDARY INLET FLOW CHANNELS

[75] Inventors: Charles Kuintzle, Jr., Monroe; Joseph P. Murphy, Newtown, both of Conn.

[73] Assignee: Avco Corporation, Stratford, Conn.

[21] Appl. No.: 948,405

[22] Filed: Oct. 4, 1978

[51] Int. Cl.³ .............................................. F04B 23/08
[52] U.S. Cl. .................................. 417/84; 415/213 C; 417/158; 417/194
[58] Field of Search ................ 417/84, 151, 158, 167, 417/194; 415/DIG. 1, 207, 211, 213 C

[56] References Cited

U.S. PATENT DOCUMENTS

| | | | |
|---|---|---|---|
| 1,444,097 | 2/1923 | Benson | 417/84 |
| 1,950,828 | 3/1934 | Thompson | 417/84 |
| 2,772,863 | 12/1956 | Harney et al. | 417/84 X |
| 3,936,223 | 2/1976 | Baghdadi | 415/207 X |
| 3,997,281 | 12/1976 | Atkinson | 415/207 |
| 4,149,828 | 4/1979 | Affri | 417/77 |
| 4,161,448 | 7/1979 | Erickson et al. | 417/84 X |

FOREIGN PATENT DOCUMENTS 866053  6/1941  France ........................... 417/84

*Primary Examiner*—Carlton R. Croyle
*Assistant Examiner*—Edward Look
*Attorney, Agent, or Firm*—Ralph D. Gelling

[57] ABSTRACT

An air pump useful in pumping gases containing abrasive particles is disclosed. A housing is constructed with a primary flow channel centered around the pump axis and a secondary flow channel annularly surrounding the primary channel just inside the outer housing wall. Within the midsection of the pump a powered impeller rotating within an axially symmetric shroud accelerates air drawn from the primary flow channel causing it to be discharged through an annular shaped ejector nozzle into a suction chamber. Presence of the high velocity airstream in the suction chamber draws the contents of the secondary flow channel into the suction chamber. The entrained contents of the primary and secondary flow channels are carried into the diffuser where the velocity energy of the mixture is converted into pressure. The pressurized mixture is then discharged through the exhaust section.

5 Claims, 3 Drawing Figures

AIR PUMP WITH PRIMARY AND SECONDARY INLET FLOW CHANNELS

BACKGROUND OF THE INVENTION

Particle separators are used to remove sand and dust from the air intake of gas turbine engines. A small fraction of the incoming air is often diverted to accomplish scavenging of the sand and dust from the separator. The pump that aids in the scavenging operation has to function in a very contaminated environment since there is a very high concentration of sand and dust in the separator exhaust. Sand particles seriously pit and degrade the performance and life expectancy of a conventional bladed-fan type air pump.

In an earlier invention which issued as U.S. Pat. No. 3,977,811 a pump was disclosed which has a self-bypassing feature. The self-bypassing feature greatly improves rotor durability for air pumps delivering large volumes of sand and dust laden air on a continuing basis. In the method of U.S. Pat. No. 3,977,811 there is still some abrasion of the pump rotor blades. This happens because the inertial dirt deflector system cannot separate out all of the sand and dust particles.

This invention solves the blade erosion problem further by essentially excluding all dust and sand particles from the airstream passing through the rotor blades of the pump. To achieve this separation, advantage is taken of two tasks which must be accomplished in an operating gas turbine engine. One task has to do with scavenging the sand and dust from the separator attached to the air intake of the engine. The other task has to do with cooling the oil passing through the heat exchanger attached to the engine gear case. The air passing through the heat exchanger used for cooling the engine oil is reasonably free from dust and sand. As such it makes a good source of air to draw through a primary flow channel and into the bladed fan portion of a pump. It is therefore the object of this invention to utilize the air drawn through the heat exchanger by accelerating it through an annular shaped ejector nozzle of an air jet pump. The high speed jet of air passing through the ejector nozzle enters a suction chamber which is connected by a secondary flow channel to the scavenge manifold of the sand and dust separator. Presence of the high velocity airstream in the suction chamber draws the sand and dust laden contents of the secondary flow channel into the suction chamber. The entrained contents of the two air sources are then exhausted overboard after passing through an annular diffuser stage.

SUMMARY OF THE INVENTION

This invention concerns an air pump which is useful in drawing sand and dust laden air from a particle separator scavenge manifold. The pump consists of a housing having an interior cylindrical duct. The duct is divided into concentric inner and outer flow channels by a cylindrical shroud mounted within the housing. The inner channel is connected to a source of primary airflow which is substantially uncontaminated. A streamlined body of revolution is mounted on the axis of the housing and extends axially within the inlet portion of the inner channel to create an annular primary airflow. A bladed rotor is mounted for rotation about the axis of the housing and is positioned to enable the blades to accelerate the primary airflow downstream of the streamlined body of revolution. An ejector nozzle is formed at the outlet of the shroud to further accelerate the primary airflow which exits therefrom into a suction chamber.

Presence of the high velocity airstream coming into the suction chamber from the ejector nozzle serves to draw the contents of the secondary flow channel into the suction chamber. The entrained contents of the primary and secondary flow channels are then carried downstream into an annular diffuser section where the velocity energy of the mixture is converted into pressure. An exhaust section downstream of the diffuser stage then passes the combined airstream out of the pump, dumping the particle laden air either overboard or into some sort of collection vessel.

What has been achieved with this invention is to enable a source of relatively clean air to be used in pumping particle laden air out of a scavenge manifold. Pumping is achieved without passing any of the particle laden air through the rotor of the pump.

BRIEF DESCRIPTION OF THE DRAWINGS

Having generally described the invention, the accompanying drawings are shown by way of illustration of a preferred embodiment thereof, in which.

DESCRIPTION OF THE PREFERRED EMBODIMENT

Figure 1:
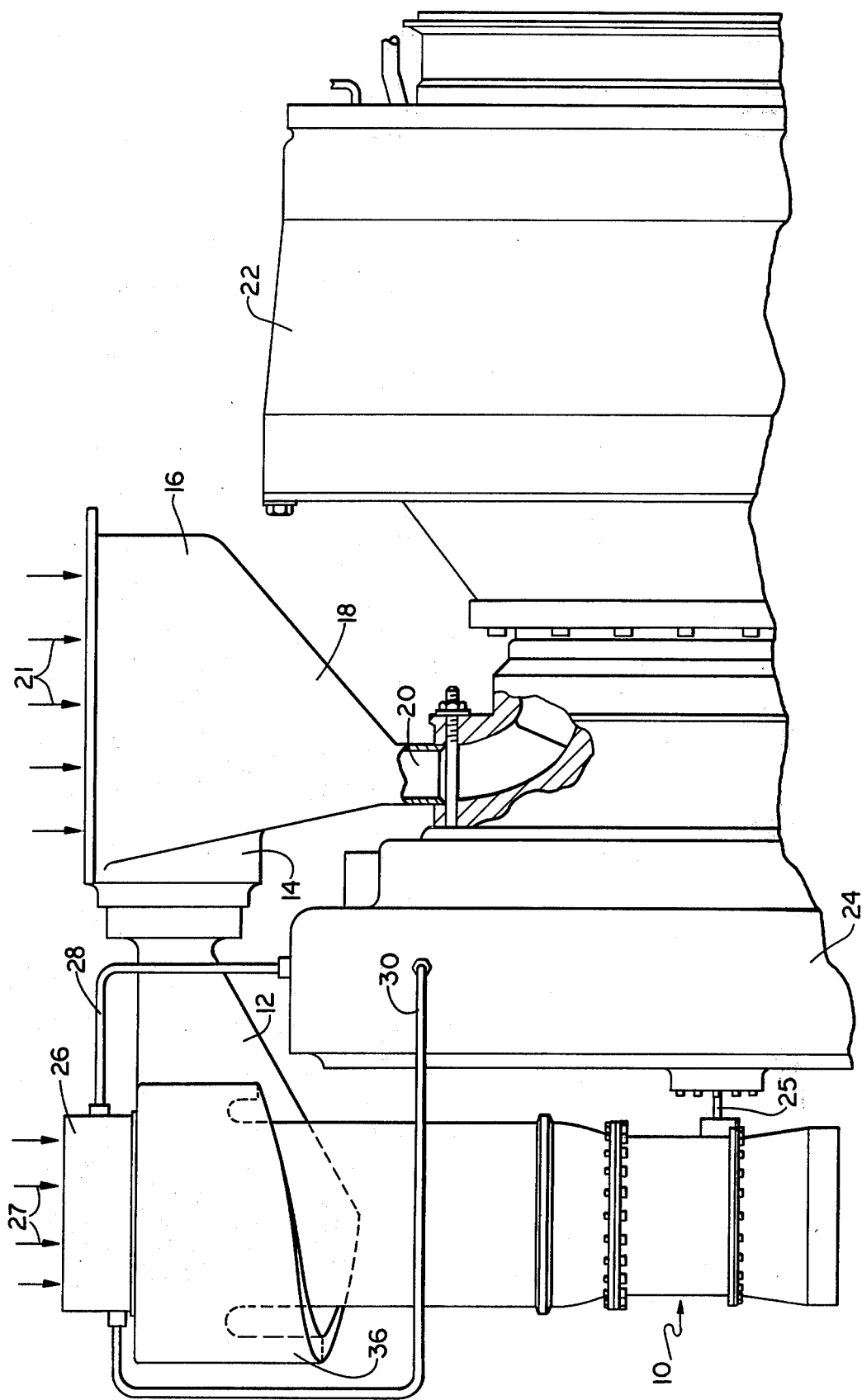
FIG. 1 shows the air pump jointly connected to the oil cooling heat exchanger and to the scavenge manifold of the particle separator used on a gas turbine engine.

In FIG. 1 there is shown an air pump 10 having one input connected by means of duct 12 to scavenge manifold 14 of particle separator 16. Particle separator 16 may be of the type shown in U.S. Pat. No. 3,970,439. The separator having air inlet 21 is secured by suitable means, such as scroll 18 and inlet duct 20, to the air intake of gas turbine 22. Separator 16 removes dust and other particles from the air prior to its entry into the inlet 20, and deposits the contaminants in scavenge manifold 14. Gear box 24 coupled to the central shaft of the gas turbine furnishes power through shaft housing 25 to drive the air pump 10. Gear box 24 contains lubricating oil which is cooled by heat exchanger 26. Oil flows to and from heat exchanger 26 via oil lines 28 and 30. Cooling air is drawn through heat exchanger 26 and into the primary airflow of pump 10 at inlet 27. The cooling air serves both to cool the gear box oil and to power the ejector nozzle 58 of air pump 10 to remove the particles from the scavenge manifold 14. In actual practice pump 10 is proportionately much smaller with respect to gas turbine 22 than is depicted in FIG. 1.

Figure 2:
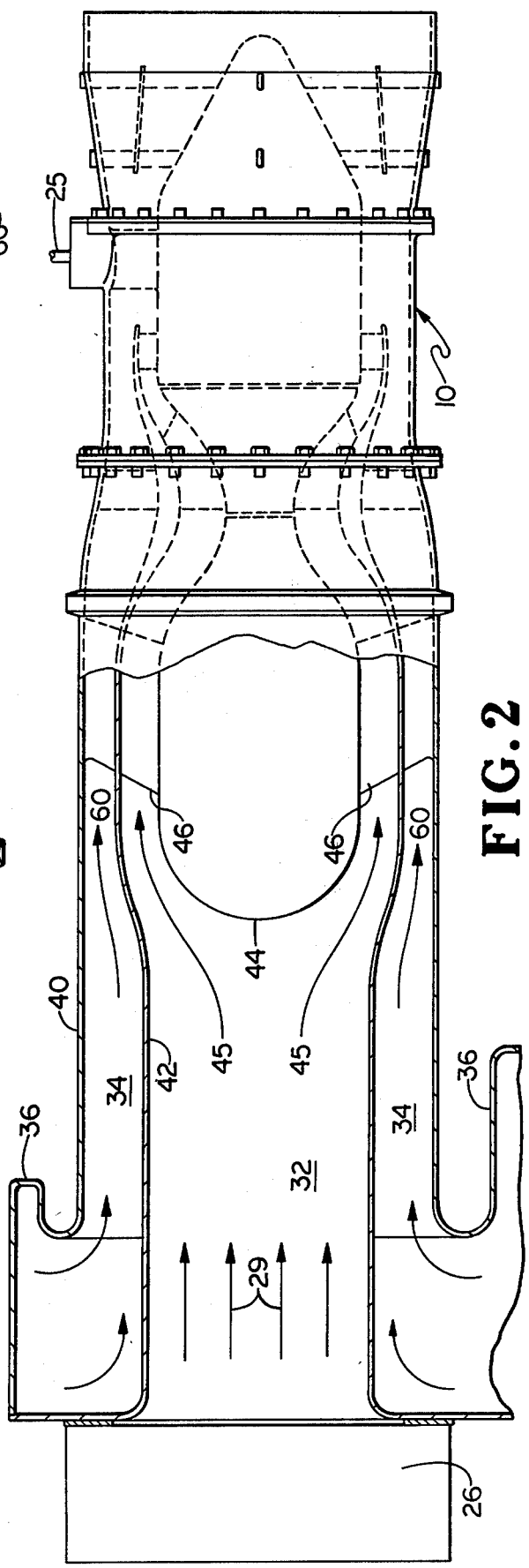
FIG. 2 shows a partially cross sectional view of an air pump having primary and secondary inlet flow channels.

Referring now to FIG. 2, there is shown a partially cutaway view of the interior of air pump 10 having both primary and secondary flow channels. The pump 10 has an outer housing 40 of circular cross section. Inside the outer housing wall 40 is a second wall 42, also of circular cross section. Wall 42 separates the primary flow channel from the secondary flow channel throughout the pump. The primary flow channel receives cooling air 29 drawn through heat exchanger 26. The primary flow channel 32 is centered around the pump axis whereas the secondary flow channel 34 comprises an annular shaped chamber surrounding the primary flow channel.

The inlet manifold 36 which joins duct 12 to secondary flow channel 34 is toroidal in shape (See FIG. 1). Shaped as shown in FIGS. 1 & 2, inlet manifold 36 accomplishes two things. First, it evenly distributes the contents of duct 12 all around the periphery of secondary flow channel 34. Second, the configuration of manifold 36 serves to impart a rotational swirl to the particle laden air being delivered to the secondary flow channel inlet. The rotational swirl both keeps the sand and dust particles in suspension and also by centrifugal action concentrates the heavier particles near outer housing wall 40.

Figure 3:
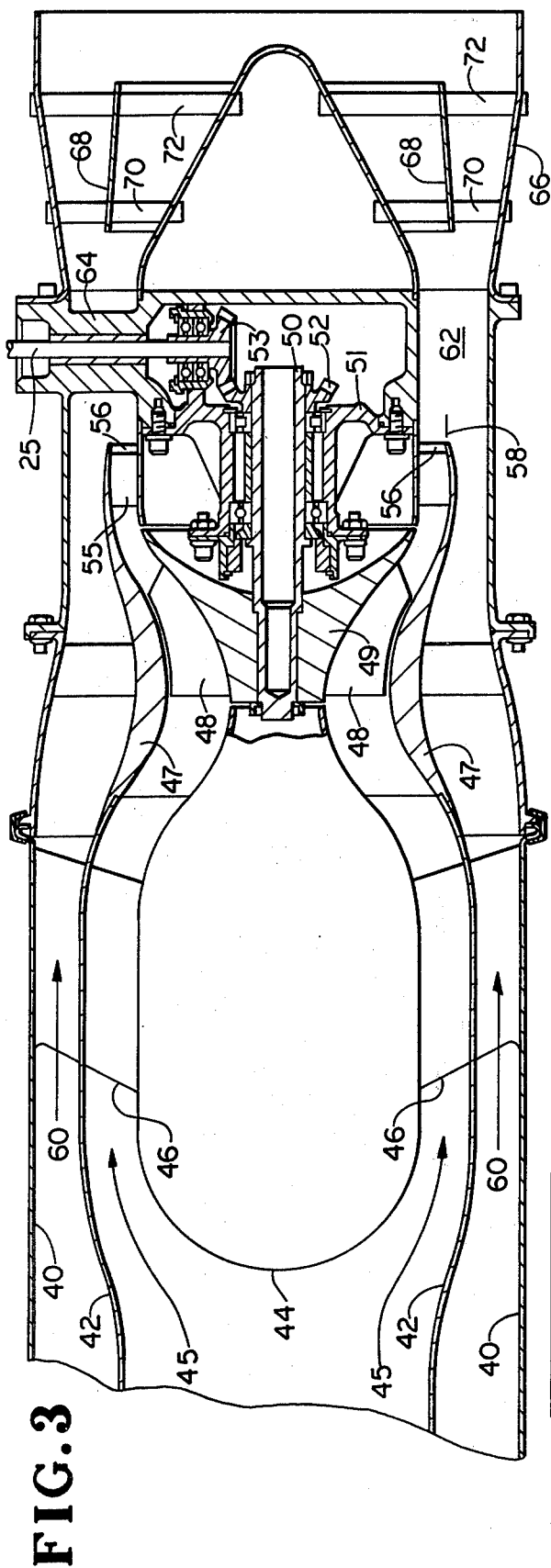
FIG. 3 shows in cross section view, the interior of the gear driven rotor blade housing of the FIG. 2 pump.

Inlet air entering the primary flow channel 32 will be diverted radially outward by streamline body of revolution 44. A series of axially extending radial inlet struts 46 serve to support streamline body of revolution 44 and at the same time guide the incoming primary airstream 45 down the interior of the pump. As shown in FIGS. 2 & 3, inlet struts 46 are axially aligned and therefore the airstream will be guided straight down the interior of the pipe. In some implementations, it may be desirable to have struts 46 set in at an angle so as to impart either a clockwise or counterclockwise twist to the airstream.

Referring now to FIG. 3, there is an annular shroud 47 positioned on the downstream side of the streamline body of revolution 44. Within annular shroud 47 is a multiplicity of impeller blades 48 integrally formed with rotor 49. Rotor 49 is mounted on one end of shaft 50 which is journaled for rotation by bearings set in support member 51. Bevel gear 52 on the other end of shaft 50 receives driving power from mating gear 53 which is also journaled for rotation on support member 51. Input driving shaft 25 delivers power to gear 53. Power for shaft 25 is derived from gear box 24 which drives the shaft at high speed.

The annular shaped primary airstream 45 is drawn within shroud 47 and accelerated by impeller blades 48 such that it exits at high velocity through annular shaped ejector primary nozzle 56 into annular shaped suction chamber 58. The high velocity air issuing forth from ejector primary nozzle 56 serves to draw the contaminated air 60 percent through the secondary flow channel 34 (See FIG. 2). The sheath of sand and dust filled air is drawn along secondary flow channel 34 past the outside of shroud 47 and into suction chamber 58. There the contents of the primary and secondary flow channels are entrained. The entrained mixture causes the heavy sand and dust particles to be equilibrated through the moving air mass in region 62. Region 62 is situated between the outer housing wall 40 and an inner shell which protects the mechanical drive mechanism. Shaft 25 passes at right angles through a housing 64 which penetrates region 62 in the manner shown in FIG. 3.

The mixing tube annulus of region 62 is followed by an annular exhaust diffuser 66. Diffuser 66 is compact with a short length to diameter ratio. A diffuser splitter vane 68 is used to retard flow separation. Splitter vane 68 consists of a thin sheet of metal having a circular cross section. Splitter vane 68 is suspended within diffuser 66 by means of a multiplicity of thin fore and aft struts 70 and 72 which are spaced at regular intervals around the diffuser. The annular exhaust diffuser 66 serves to slow down the entrained mixture of primary and secondary channel gases and at the same time brings about a net rise in gas pressure.

It should be mentioned that air comes off the periphery of the impeller blades 48 at an angle which approximates a tangent to the circumference of the blades. To turn this air flow back to an axial direction there is inserted in the channel a series of curved accelerating vanes 55. Vanes 55 are connected between the gear box wall and shroud 47. In end view, each of the vanes 55 are curved to approximate the arc of a circle. As such, the vanes redirect the air coming from the impeller such that it passes axially through the ejector nozzle and into the suction chamber.

We claim:

1. An air pump useful in pumping gases containing abrasive particles comprising:
   an outer cylindrical housing having an axially extending inner duct, said duct having an inlet and an outlet;
   a cylindrical shroud mounted within the housing to divide the duct into inner and outer axially extending channels;
   a source of primary air flow being relatively free of contaminants connected to the inner channel;
   a source of secondary airflow which is desired to be pumped, said source being connected to the outer channel of the duct;
   a streamline body of revolution mounted within the housing on the axis thereof, said body positioned at the inlet end of the inner channel to cause a uniform annular primary airflow, said body supported by equi-spaced radial inlet struts connecting said streamline body of revolution with said outer housing, each of said struts along its length penetrating through a close fitting opening in the outer wall separating the primary and secondary flow channels;
   a powered rotor mounted within the housing for rotation about the axis thereof, downstream of the streamlined body of revolution, the blades of said rotor extending into the inner channel of the duct to accelerate the primary airflow;
   an annular shaped ejector nozzle formed in the outlet end of the shroud downstream of the rotor to cause further acceleration of the primary airflow;
   a suction chamber formed in the duct downstream of the ejector nozzle to receive the high velocity primary airflow therefrom, and connected to the outer channel to receive the secondary airflow therefrom, the flow of high velocity primary airflow into said chamber serving to pump the secondary airflow through the outer channel; and
   means connected to the suction chamber to dispense the contents of the suction chamber from the pump.

2. The invention as defined in claim 1 and a mixing tube annulus region in communication with said ejector nozzle and said suction chamber.

3. The apparatus as defined in claim 2 and including an axially symmetric annular shaped diffuser stage in communication with the outlet end of said mixing region, said diffuser being adjacent to the outlet end of said pump housing.

4. The apparatus as defined in claim 3 wherein said annular shaped diffuser stage includes a splitter vane whereby flow separation is retarded.

5. The apparatus as defined in claim 1 wherein each of said equi-spaced radial inlet struts has an axially extending span width whereby the incoming airstreams in both the primary and secondary flow channels are made to follow a directed flow path as they pass down the interior of said pump.

* * * * *